Aug. 21, 1951 W. W. GARSTANG ET AL 2,565,304

RADIO-PHONOGRAPH CABINET

Filed June 10, 1947 6 Sheets-Sheet 1

INVENTOR.

William W. Garstang

BY William R. McFarlane

W. R. Hahn

ATTORNEY

Aug. 21, 1951 W. W. GARSTANG ET AL 2,565,304

RADIO-PHONOGRAPH CABINET

Filed June 10, 1947 6 Sheets-Sheet 2

INVENTOR.
William W. Garstang
BY William R. McFarlane
W. P. Hahn
ATTORNEY

INVENTOR.
BY William W. Garstang
William R. McFarlane
W. P. Hahn
ATTORNEY

INVENTOR.

William W. Garstang
BY William R. McFarlane

W. P. Hahn

ATTORNEY

Aug. 21, 1951 W. W. GARSTANG ET AL 2,565,304

RADIO-PHONOGRAPH CABINET

Filed June 10, 1947 6 Sheets-Sheet 5

INVENTOR.
William W. Garstang
William R. McFarlane
BY
W. R. Hahn
ATTORNEY.

Aug. 21, 1951 W. W. GARSTANG ET AL 2,565,304

RADIO-PHONOGRAPH CABINET

Filed June 10, 1947 6 Sheets-Sheet 6

INVENTOR.
William W. Garstang
William R. McFarlane
BY
W. P. Hahn
ATTORNEY.

Patented Aug. 21, 1951 2,565,304

UNITED STATES PATENT OFFICE 2,565,304

RADIO-PHONOGRAPH CABINET

William W. Garstang and William R. McFarlane, Indianapolis, Ind., assignors, by mesne assignments, to Cornell-Dubilier Electric Corporation, South Plainfield, N. J., a corporation of Delaware Application June 10, 1947, Serial No. 753,826

10 Claims. (Cl. 250—16)

The present invention relates to improvements in cabinets adapted particularly for the accommodation of combined radio-phonographs.

It has for one of its objects that of providing a cabinet, wherein a phonograph structure may be so mounted that, when not in use, it is entirely enclosed and concealed and one which, when the phonograph is desired for operation, may be operated to render such phonograph accessible with a minimum of effort on the part of the operator.

Another object of the invention is to provide a cabinet so arranged that access may be had to the phonograph, without disturbing any articles which may be placed on top of the cabinet.

Another object of the invention is that of producing a cabinet having a phonograph mechanism mounted on a table or platform normally positioned below the top of the cabinet, together with means for raising a phonograph playing mechanism to substantially the level of the cabinet top to render the same accessible.

For the purpose of disclosing the invention, we have illustrated certain embodiments thereof in the accompanying drawings, in which.

Figure 1:
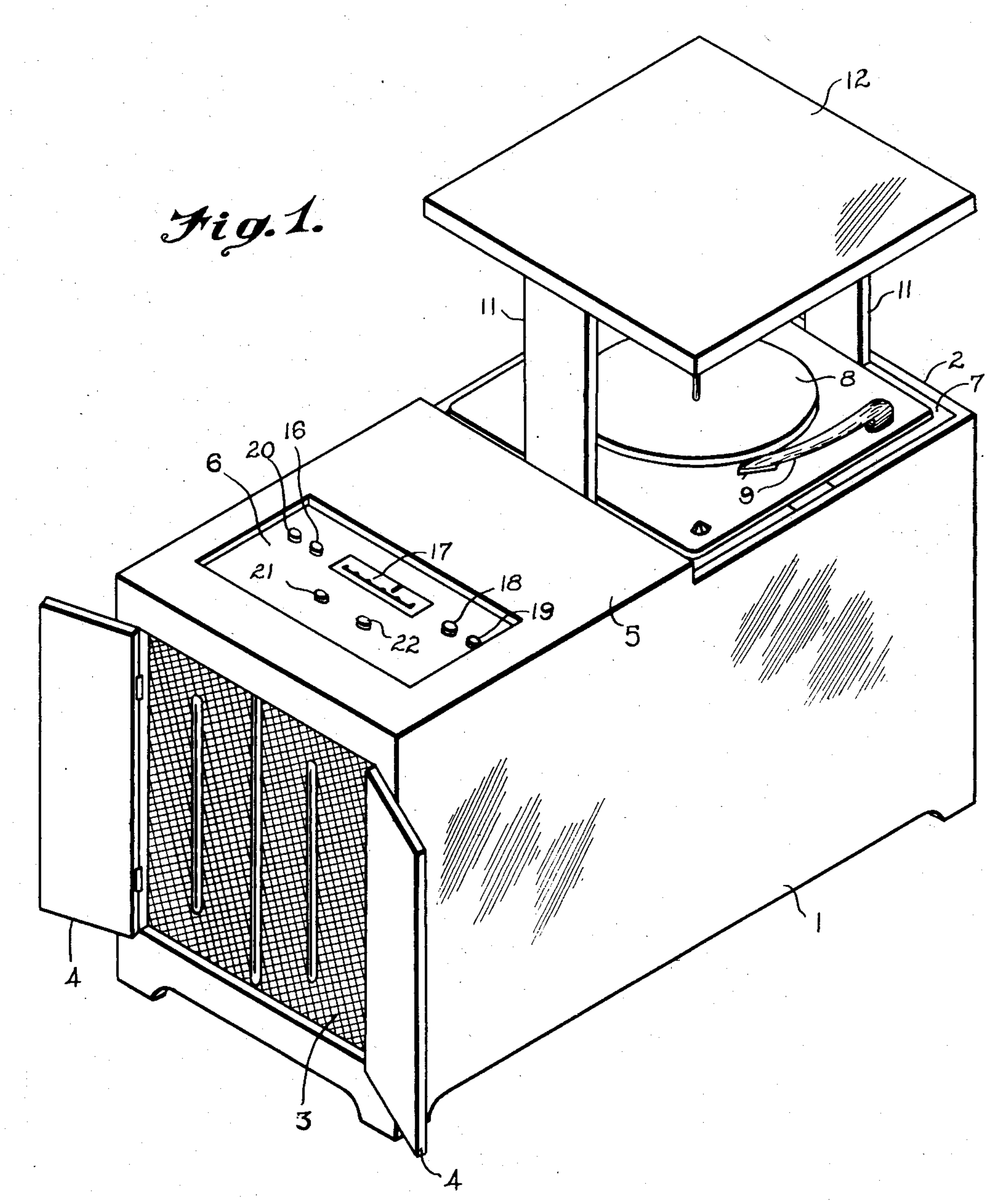
Fig. 1 is a perspective view of the cabinet, with the sound producing apparatus in position of accessibility.
Figures 2, 5, 6:
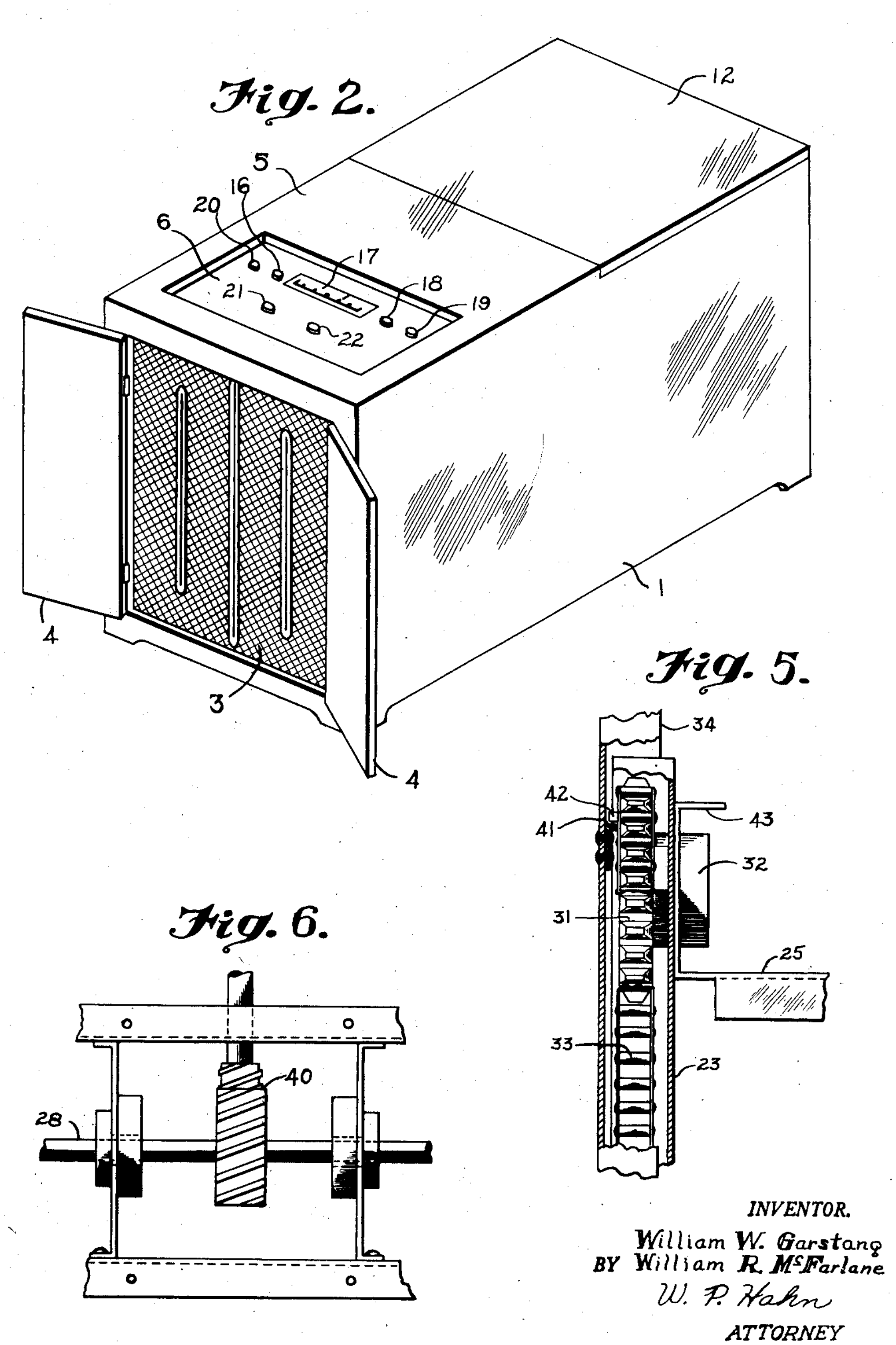
Fig. 2 is a perspective view of the cabinet, with the sound producing apparatus in its normal or inaccessible position.
Fig. 5 is a detail sectional view of a portion of the platform elevating mechanism.
Fig. 6 is a detail elevation, showing the drive connection between the elevating drive shaft and the power mechanism.
Figure 3:
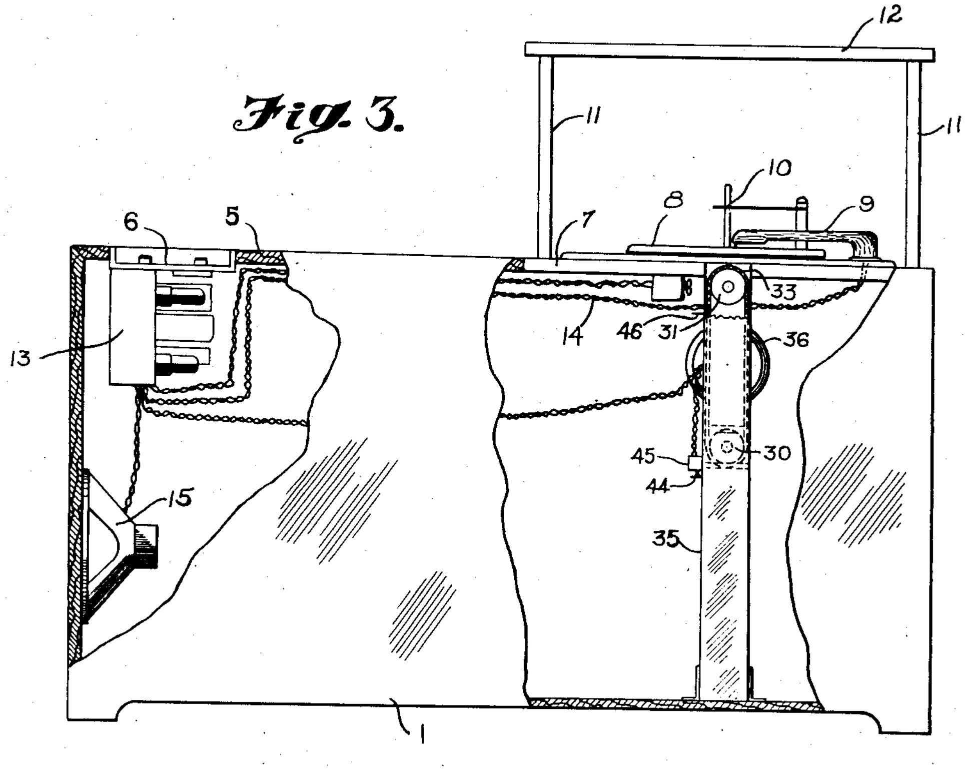
Fig. 3 is a side elevation of the cabinet, with one side broken away, showing the details of the operating structure.

In the embodiment illustrated, we have provided a substantially rectangular cabinet having its side and rear ends closed by panels 1 and 2 and its front provided with a suitable grill 3 adapted, when not in use, to be covered by doors 4 hinged at their sides. A portion of the top of this cabinet is closed by a top panel 5 having a suitable countersunk portion, within which is arranged a control panel 6.

Within the rear portion of the cabinet is mounted a suitable vertically movable platform 7, which is adapted to receive and support a phonograph turntable 8 with its accompanying pick-up arm 9 and record feeding mechanism 10. This phonograph turntable mechanism is of standard design and a detailed description thereof need not be entered into.

Extending upwardly from the platform 7 is a pair of vertically extending supporting struts 11—11, at the top of which is supported a cover 12, which cover when in its lower position closes the rear portion of the cabinet and lies in the same horizontal plane as the front cover 5 of the cabinet.

Arranged at the front of the cabinet and beneath the control panel 6 is a suitable radio receiving set 13 which may be mounted upon and supported from the panel 6 and which may be of standard construction for the reception of radio broadcasts. This radio set 13 is also provided with a broadcast cable connection 14 extending to the phonograph pick-up arm 9, so that the vibrations produced in the pick-up arm 9 may be translated into audible sounds in the radio broadcast receiving set. The receiving set is also connected by suitable cable connections with a loud speaker 15 mounted in the rear of the front grill 3.

The control panel 6 is provided with a control button 16 adapted to control the on and off and volume of the radio set 13. The panel likewise is provided with an indicator dial 17 and the station selector button 18, as well as two tone control buttons 19 and 20. For controlling the drive of the phonograph turntable 8 and the switching from radio reception to phonograph reception, there is provided a control button 21 and for controlling the elevating mechanism of the platform 7, there is provided a control button 22. These control buttons all operate suitable controlling switches, which have suitable cable or electrical connections with the part controlled thereby.

The elevating mechanism for the platform 7 comprises a pair of channelled side members 23 and 24 connected adjacent their top by a crossbrace 25 and at their bottom by a crossbrace, which also functions as a supporting platform for the elevator drive motor. This supporting brace-platform comprises a rectangular frame 26 connected at its ends to the side members 23 and 24 by connecting braces as at 27. A drive shaft 28 is transversely mounted in the frame 26 and at its opposite ends is journalled in bearings 29—29 supported in the channelled side members 23 and 24. The opposite ends of the drive shaft 28 have secured thereon sprocket wheels 30—30, which are rotated by the shaft 28. A second pair of sprocket wheels 31—31 is mounted in bearings 32—32 supported in the upper ends of the channels 23 and 24 and continuous sprocket chains 33—33 connect the sprocket wheels 30 and 31. The side members 23 and 24 operate within channel members 34 and 35 secured on the inner faces of the sides of the cabinet, which channel members extend from the bottom to the top of the cabinet and which not only telescopically receive the channel members 23 and 24 and provide guides therefor, but also provide guides for the platform 7, which it will be noted is provided with guide recesses or slots adapted to receive the sides of the channel members 34 and 35 as the platform raises and lowers.

The shaft 28 is driven from an electric motor 36 mounted on the frame platform 26 and provided with a reduction gear drive 37 for transmitting rotary motion to a vertical drive shaft 38. This drive shaft has interposed therein a suitable clutch member 39 and is connected by a suitable worm drive 40 with the shaft 28.

In the upper end of the channels 34 and 35, we provide a pair of stop members which comprise suitable lugs or ears 41 riveted or otherwise secured to the backs of the channels 34 and 35. These ears cooperate with the extending pins 42 on the sprocket chains 33—33, so that relative rotation, at least in one direction, is prevented between the sprocket chains and the guide channels 34 and 35. Therefore, with the drive motor 36 driving the shaft 28 in a counterclockwise direction and with the sprocket chains 31—31 being held against counterclockwise rotation by the ears 41 and pins 42, the whole elevating mechanism will be raised under the drive of the motor 36, and as the platform 7 rests upon the inturned ears 43 supported on the side members 23 and 24, the platform, together with the top 12 and the phonograph mechanism, will be elevated to the desired point. When the platform 7 reaches the same plane as the cabinet top, a trip in the form of an ear 44 on the frame 26 will strike a control switch 45 opening the circuit of the motor and stopping the elevation of the platform, at the same time throwing this limit switch to a position to reverse the operation of the motor, when it is desired to lower the platform. A similar trip ear 46 is provided on the transverse brace 25 which, when the elevating mechanism reaches the limit of its lower movement, throws the switch 45 to reverse the drive of the motor, when the circuit therethrough is completed through the control button 22.

It is to be noted that the platform 7 merely rests upon the ear supports 43 and is not rigidly connected thereto. Therefore, there being no permanent lowering drive connection between the platform 7 and the elevating mechanism, in event the operator should, by any chance, have his hand beneath the top panel 12 as it reaches its lowermost position, there will be no danger of the crushing of the hand as the platform 7 will merely lift up off of the supports 43.

When, after the platform has been raised to a position to render the phonograph mechanism accessible, if it is desired to lower the platform, the circuit may again be closed through the motor 36 by the control switch button 22 and the motor drive will be reversed, thereby permitting the platform and elevating mechanism to lower to its concealed position.

Figure 8:
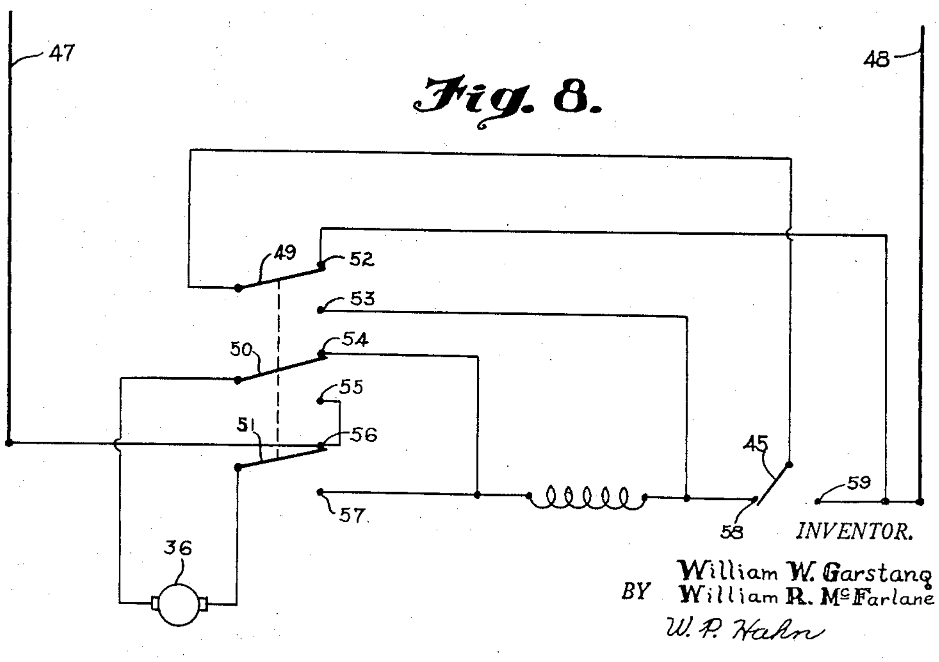
Fig. 8 is a diagrammatic view of the circuit arrangement for controlling the operation of the elevating mechanism.
Figure 4:
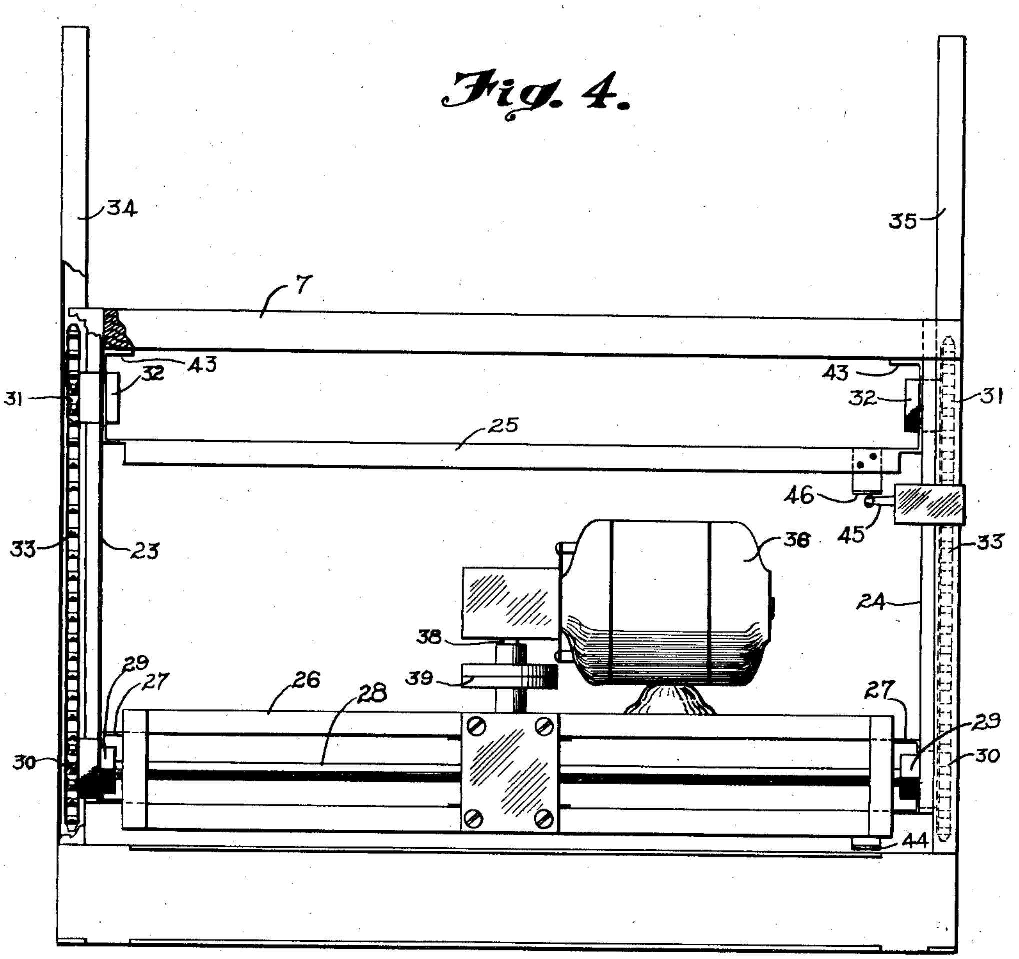
Fig. 4 is a detail end elevation of the platform elevating mechanism, certain parts being broken away for illustrative detail.
Figure 7:
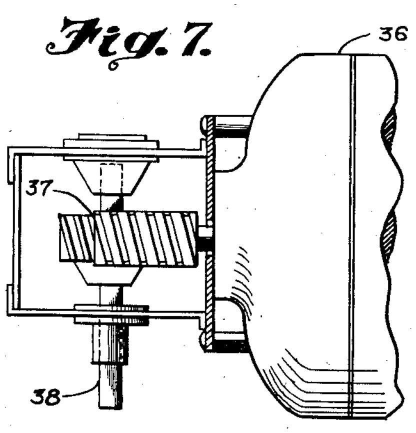
Fig. 7 is a detail section elevation, showing the power drive take-off from the motor.

In the circuit arrangement illustrated in Fig. 8, the power supply lines leading to the drive motor are indicated at 47 and 48. The switch controlled by the control button 22 comprises a plurality of mechanically connected switch arms 49, 50 and 51. The switch arm 49 cooperates with contacts 52 and 53 and the switch arm 50 cooperates with the contacts 54 and 55, while the switch arm 51 cooperates with contacts 56 and 57. The switch arms 50 and 51 are connected to the motor 36. The limit switch 45 cooperates with contacts 58 and 59. Therefore, with the limit switch 45 in the position illustrated, the circuit will be closed through the motor 36 to drive the same in one direction, say the elevating direction. As soon as the elevator reaches the limit of its upward movement, the trip 44 will throw the limit switch 45 in the opposite direction, thereby opening the circuit of the motor and bringing the elevating mechanism to a rest. As soon, however, as the control switch button 22 is again rotated to throw the switch arms 49, 50 and 51 in the opposite direction, the circuit will again be established through the motor 36 to drive the same in the reverse direction and the elevating mechanism will lower until the trip 46 is reached, at which time the limit switch 45 will be thrown in a reverse direction ready again to elevate the mechanism.

Figures 9, 10:
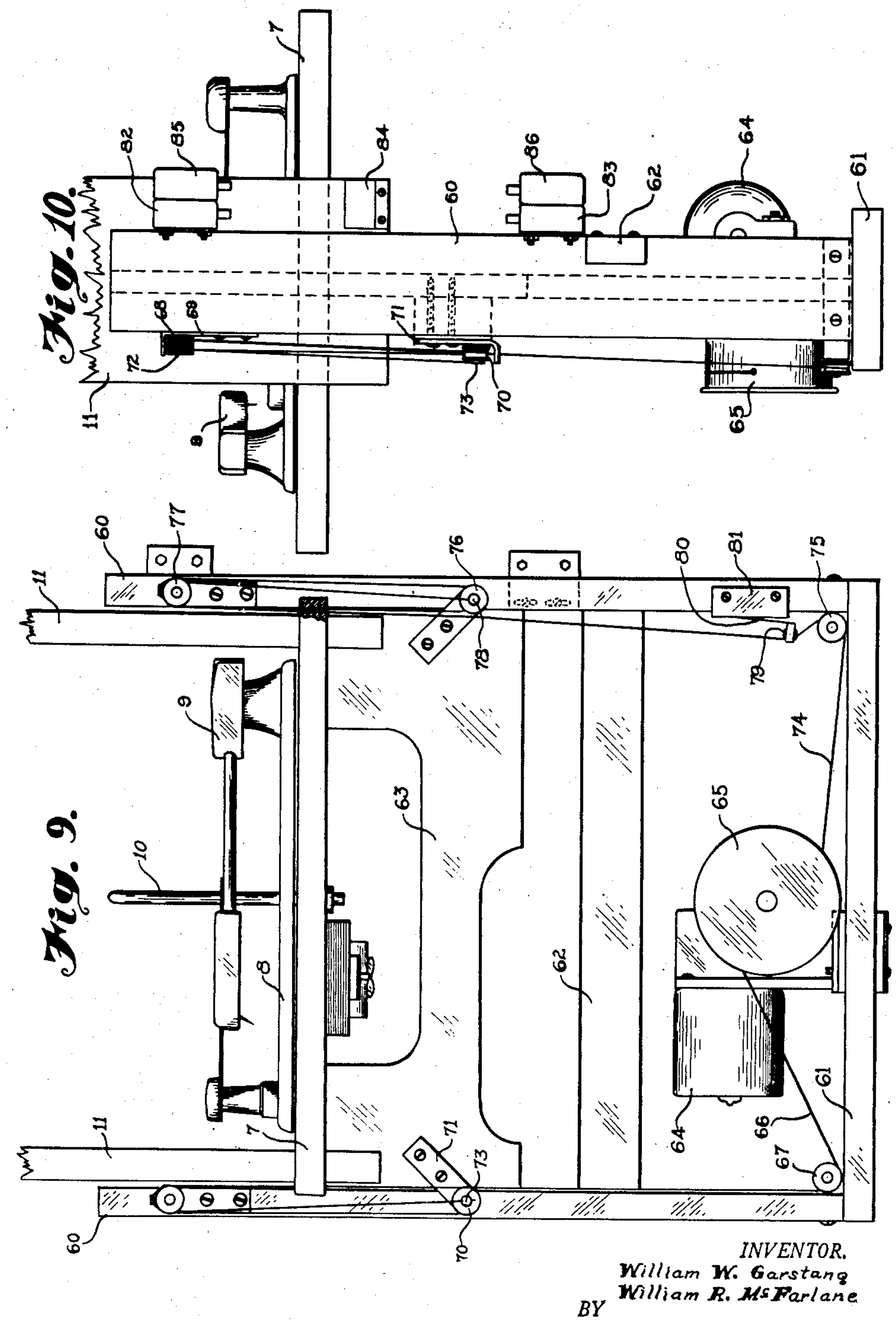
Fig. 9 is a front elevation of a modified form of elevating mechanism.
Fig. 10 is an end elevation thereof.

In Figs. 9 and 10, we have illustrated a modified form of elevating mechanism for the platform 7 and its associated parts. In this structure, as in the structures heretofore disclosed, the platform 7 carries the reproducing arm 9 and turntable 8, together with the magazine feed mechanism 10. This platform, like the platform 7 in Figs. 1 to 7, also has the side riser parts 11 supporting the closure top 12. A platform moves vertically between the two side posts 60, which extend upwardly from a bottom or base 61 and which are cross-braced by an intermediate brace 62. Depending from the platform 7 is a panel 63 for the purpose more fully hereinafter to appear. For raising and lowering the platform, we provide a drive mechanism, comprising a reversible motor 64 which is mounted on the base 61. This motor drives a drum 65 around which passes a cable, one portion 66 of which passes beneath the guide pulley 67 secured to one of the posts 60. This pulley then passes upwardly over a pulley 68 secured in a bracket 69 fastened to one of the stationary guides 60. The cable then passes downwardly over a guide pulley 70 carried by a bracket 71 secured to the panel 63 depending from the base 7. The cable then passes upwardly across and over a guide pulley 72 carried by the bracket 69 and thence downwardly having its free end secured to the pin 73, on which the pulley 70 is adapted to rotate and accordingly, is fastened to the panel 63 and thus to the platform 7. The opposite portion 74 of the cable passes beneath a guide pulley 75, thence upwardly over a top guide pulley, thence downwardly over a guide pulley 76 corresponding to the guide pulley 73, thence upwardly and over a guide pulley 77 and downwardly again to be secured to the fixed pin 78. It is therefore, apparent that the two cable sections 66 and 77 are the same in structure and operation, so that an equal application of power is made to the two sides of the platform. As the portion 74 of the cable passes upwardly from the pulley 75, it bears against a small pulley 79 secured to a spring arm 80 of a control switch 81.

There is sufficient tension upon this cable portion to maintain, through the arm 80, the switch 81 in closed position. However, in event the operator should catch his hand beneath the platform 7, during the lowering of the platform, the cable portion 74 would tend to slack, thereby relieving the tension on the arm 80 which would permit the arm 80 to move the switch 81 into open position, thereby opening the circuit of the motor 64 and stopping the same. Therefore, the structure is such that danger of injury to an operator, in event he gets his hand beneath the platform 7, is prevented and furthermore, if for any other reason the platform is stopped in its lowering movement, continued rotation of the motor is discontinued thus preventing the fouling of the cables.

In addition to the switch 81, there is provided an upper limit switch 82 and a lower limit switch 83, which are secured to one of the uprights 60 and so disposed in the path of a lip 84, mounted upon and movable with one of the side members 11, that when the lip 84 engages the upper limit switch 82, the motor circuit will be opened, thereby stopping the elevating drive and when the lip 84 strikes the lower switch 83 at the lowermost movement of the platform 7, the switch 83 will be opened, thereby stopping the lowering drive of the motor 64. In addition to the switches 82 and 83, we provide a pair of muting switches 85 and 86 mounted adjacent the switches 82 and 83. These switches are normally closed and thereby short-circuit the loud speaker 15. As soon, however, as the lip 84 reaches the upper limit of travel, it will open the muting switch 85, thereby opening the short circuit around the loud speaker, thus rendering the loud speaker operable and the same condition exists when the switch 84 reaches the lowering of its movement. By this arrangement, the loud speaker is cut out or muted during the operation of the elevating motor, thereby prevening any noise of the motor being reproduced in the loud speaker during the operation of the motor during its elevating and lowering movement.

Figures 11, 12:
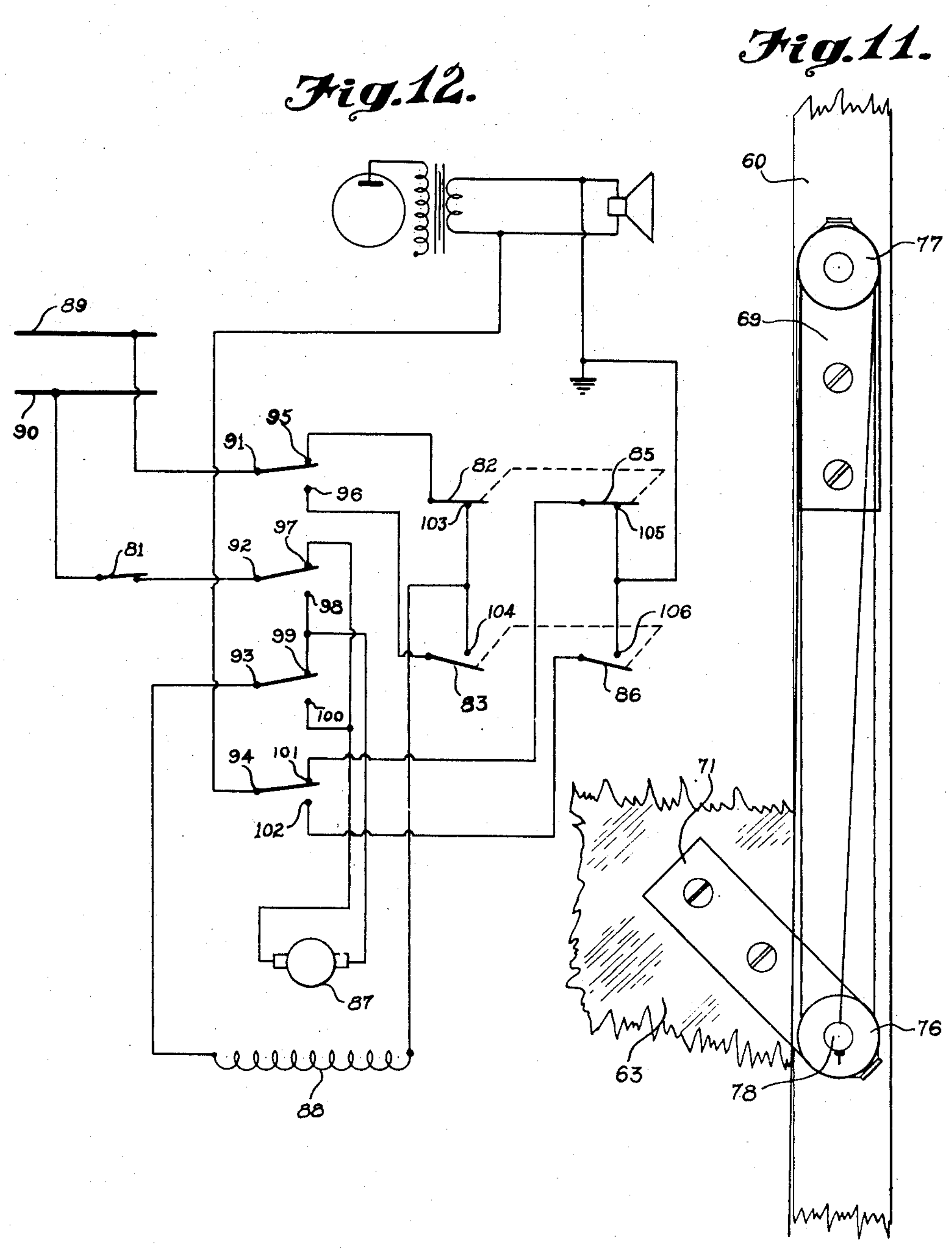
Fig. 11 is a detail of the cable drive of the elevating mechanism shown in Fig. 9.
Fig. 12 is a diagrammatic view of a circuit arrangement for controlling the elevating mechanism.

In the diagrammatic view of the circuit arrangement illustrated in Fig. 12, we provide a series wound motor having an armature 87 and a field 88 which are adapted to be connected with a source of alternating current supply, comprising the input leads 89 and 90. The control button 22 is adapted to operate a switch, including the switch arms 91, 92, 93 and 94, all mechanically connected to move in unison. The switch arm 91 operates between a pair of stationary contacts 95 and 96. The switch arm 92 operates between a pair of stationary contacts 97 and 98. The switch arm 93 operates between a pair of stationary contacts 99 and 100 and the switch arm 94 operates between a pair of stationary contacts 101 and 102. The limit switch 82 cooperates with a stationary contact 103 and the down limit switch 83 cooperates with a stationary contact 104. The up muting switch 85 cooperates with a stationary contact 105 and the down muting switch 86 cooperates with a stationary contact 106. These two contacts 105 and 106 are connected to one side of a loud speaker circuit, the opposite side of this circuit being connected to the switch arm 94. The two stationary contacts 103 and 104 are connected to one side of the field 88. Accordingly, when the switch 22 is moved to move the arms 91 to 94, inclusive, to the position illustrated in Fig. 12, the motor circuit is closed to elevate the table or platform 7 and it will be noted that a circuit is established through the safety switch 81 across the switch arm 93 across the switch arm 82 of the limit switch and the arm 91 of the control switch back to the opposite side of the line, thereby starting the motor to drive and elevate the platform. During the elevation of the platform the muting switch 85 is closed and therefore, the loud speaker is shorted across the arm 85, across the switch arm 94 and back to the opposite side of the loud speaker circuit. Therefore, the loud speaker circuit will not be energized and no noise resulting from the operation of the motor will be discernable over the loud speaker 15. When the platform has reached the upper limit of its movement, it will cause the switch arms 82 and 85 to open, thereby opening the circuit of the motor and also opening the short across the loud speaker circuit, so that the platform will come to a stop and the loud speaker circuit may be energized by the connected circuits. With the limit switch 82 and the muting switch 85 open, it will be noted that the down limit switch 104 and the down muting switch 106 will be closed. Accordingly, when it is desired to lower the platform 7, the switch button 22 is operated to swing the switch arms 91 to 94, from the position illustrated, to engage the contacts 96, 98, 100 and 102 and the circuit of the motor will again be energized to cause the motor to drive the platform downwardly, until the limit switch 104 is open and the muting switch 106 is open, so that the playing apparatus may be operated, with the platform and cabinet top in their lower positions.

We claim as our invention:

1. A cabinet for radio signal apparatus comprising enclosing side and end walls and having an opening in the upper side of said cabinet, a closure member for said opening, a supporting platform beneath and spaced apart from said closure member, said closure member and platform being connected to vertically move coincidentally, elevating mechanism for effecting vertical movement of said closure member and said platform, a reversable electric driving motor, a positive two way driving connection between said motor and elevating mechanism to positively drive said elevating mechanism in both upward and downward directions, a one way driving connection between said elevating mechanism and said platform, driving said platform in an upward direction and drivingly releasable from said platform when the driving mechanism is driven in a downward direction, and motor control means operable to stop said elevating mechanism, when said cover member and said platform reach predetermined upper and lower levels.

2. A cabinet for radio signal apparatus comprising enclosing side and end walls and having an opening on its upper side, a closure member for said opening having a vertical right line movement to expose said opening and a platform supported beneath said closure member spaced apart from said closure member and having a vertical movement coincident with said closure member, elevating mechanism for said platform and closure member mounted within said cabinet, a reservable electric driving motor, a positive two way driving connection between said elevating mechanism and said motor to positively drive said mechanism in both upward and downward directions, a one way driving connection between said elevating mechanism and said platform driving said platform in an upward direction and drivingly releasable from said platform when the driving mechanism is driven downwardly, and a control switch for said motor mounted on the exterior of said cabinet for controlling the operation of said motor to elevate and lower said platform.

3. A cabinet for radio signal apparatus comprising enclosing side and end walls and having an opening in its upper side, a closure member for said opening having vertical right line movement to expose said opening and a platform supported beneath the said closure member spaced apart from said closure member and vertically movable coincidentally with said closure member, elevating mechanism for said platform and closure member mounted within said cabinet, a reversable electric driving motor, a positive two way driving connection between said motor and said elevating mechanism to positively drive said elevating mechanism in both upward and downward directions, a one way driving connection between said elevating mechanism and said platform driving said platform in an upward direction and drivingly releasably from said platform when the driving mechanism is driven in a downward direction, a control switch for said motor mounted on the exterior of said cabinet for controlling the operation of said motor for elevating and lowering said platform and limit switches mounted within said cabinet and operated by said elevating mechanism for stopping said motor, when said cover and platform reach predetermined upper and lower levels.

4. A cabinet for radio signal apparatus comprising side and end members and having an opening in the top, a vertically movable platform mounted within said cabinet and a cover member for said opening supported by said platform and in spaced relation above said platform, elevating means for said platform mounted within said cabinet, a reversable electric driving motor having a two way driving connection between said elevating mechanism and said motor to positively drive said mechanism in both upward and downward direction, a one way driving connection between said elevating mechanism and said platform driving said platform in an upward direction and drivingly releasable from said platform when the driving mechanism is driven downwardly, limit switches for said motor operated by said elevating mechanism to stop said motor in its elevating drive, when said platform reaches the plane of the top of said cabinet and for stopping said motor in its lowering drive, when said closure member reaches the plane of the top of said cabinet, and a switch control member for said motor mounted on the exterior of said cabinet.

5. A cabinet for radio signal apparatus comprising side and end members and having an opening in its top, a vertically movable platform mounted within said cabinet and a cover member for said opening supported in spaced relation above said platform and vertically movable with said platform, elevating mechanism for said platform, including a reversable electric motor positively driving said elevating mechanism in both upward and downward directions, switching means for controlling the operation of said motor and means effective for rendering said elevating mechanism inoperative to lower said platform upon the meeting of said platform with an obstruction preventing the continued lowering movement thereof under the drive of said motor.

6. A cabinet for radio signal apparatus comprising side and end walls and having an opening in the upper side of said cabinet, a closure member for said opening, a supporting platform beneath and spaced apart from said closure member, said platform and closure member being vertically movable coincidentally, elevating mechanism for effecting vertical movement of said closure member and platform, including a pair of flexible operating members having a one way driving connection with opposite sides of said closure member and platform, an electric motor mounted within said cabinet and two way driving connections between said motor and said flexible operating means for simultaneously driving said operating means.

7. A cabinet for radio signal apparatus comprising side and end walls and having an opening in the upper side thereof, a closure member for said opening, a supporting platform beneath and spaced apart from said closure member, said platform and closure member being vertically movable coincidentally, elevating mechanism for effecting vertical movement of said closure member and platform, including driving cables fixedly connected to opposite sides of said closure member and platform, fixed members over which said cables pass, a driving drum for said cables and a reversible driving motor for positively rotating said drum to elevate said platform and cover member and reversible to slack said cables and permit said platform and cover member to lower by gravity.

8. A cabinet for radio signal apparatus comprising side and end walls and having an opening in the upper side thereof, a closure member for said opening, a supporting platform beneath and spaced apart from said closure member, said platform and closure member being vertically movable coincidentally, elevating mechanism for effecting vertical movement of said closure member and platform, including driving cables disposed on opposite sides of said cover and platform and fixedly connected thereto, fixed means over which said cables pass, a drive drum for said cables and a reversible driving motor for driving said drum in one direction for positively elevating said cover member and platform and reversible to slack said cables to permit said cover member and platform to move downwardly under the influence of gravity, the rate of rotation of said driving motor in its reverse direction being such that the gravity weight of the cover member and platform will maintain said cables under tension.

9. A cabinet for radio signal apparatus comprising side and end walls and having an opening in the upper side thereof, a closure member for said opening, a supporting platform beneath and spaced apart from said closure member, said platform and closure member being vertically movable coincidentally, elevating mechanism for effecting the vertical movement of said closure member and platform, including driving cables fixedly connected to opposite sides of said closure member and platform, fixed members over which said cables pass, a driving drum for said cables, a reversible driving motor for driving said drum in one direction to effect the elevation of said closure member and platform, and in a reverse direction to slack said cables to permit said platform and cover member to lower by gravity, and a control switch for stopping said motor, in event said platform and cover member are stopped in their lowering movement.

10. A cabinet for radio signal apparatus comprising side and end walls and having an opening in the upper side thereof, a closure member for said opening, a supporting platform beneath and spaced apart from said closure member, said platform and closure member being vertically movable coincidentally, elevating mechanism for effecting the vertical movement of said closure member, said platform includig a pair of driving cables fixedly connected to opposite sides of said closure member and platform, fixed members over which said cables pass, a driving drum for said cables, a reversible driving motor for driving said drum in one direction for positively elevating said closure member and platform, and in a reverse direction to slack said cables to permit said elevator and platform to descend by gravity, and a control switch operated by undue slackness on at least one of said cables for stopping said motor.

WILLIAM W. GARSTANG.
WILLIAM R. McFARLANE.

REFERENCES CITED

The following references are of record in the file of this patent:

UNITED STATES PATENTS

| Number | Name | Date |
|---|---|---|
| 1,710,465 | Acosta | Apr. 23, 1929 |
| 2,096,256 | Mitchell | Oct. 19, 1937 |
| 2,288,822 | McCarron | July 7, 1942 |